March 24, 1959 — G. A. LYON — 2,879,108
WHEEL COVER
Filed July 22, 1955
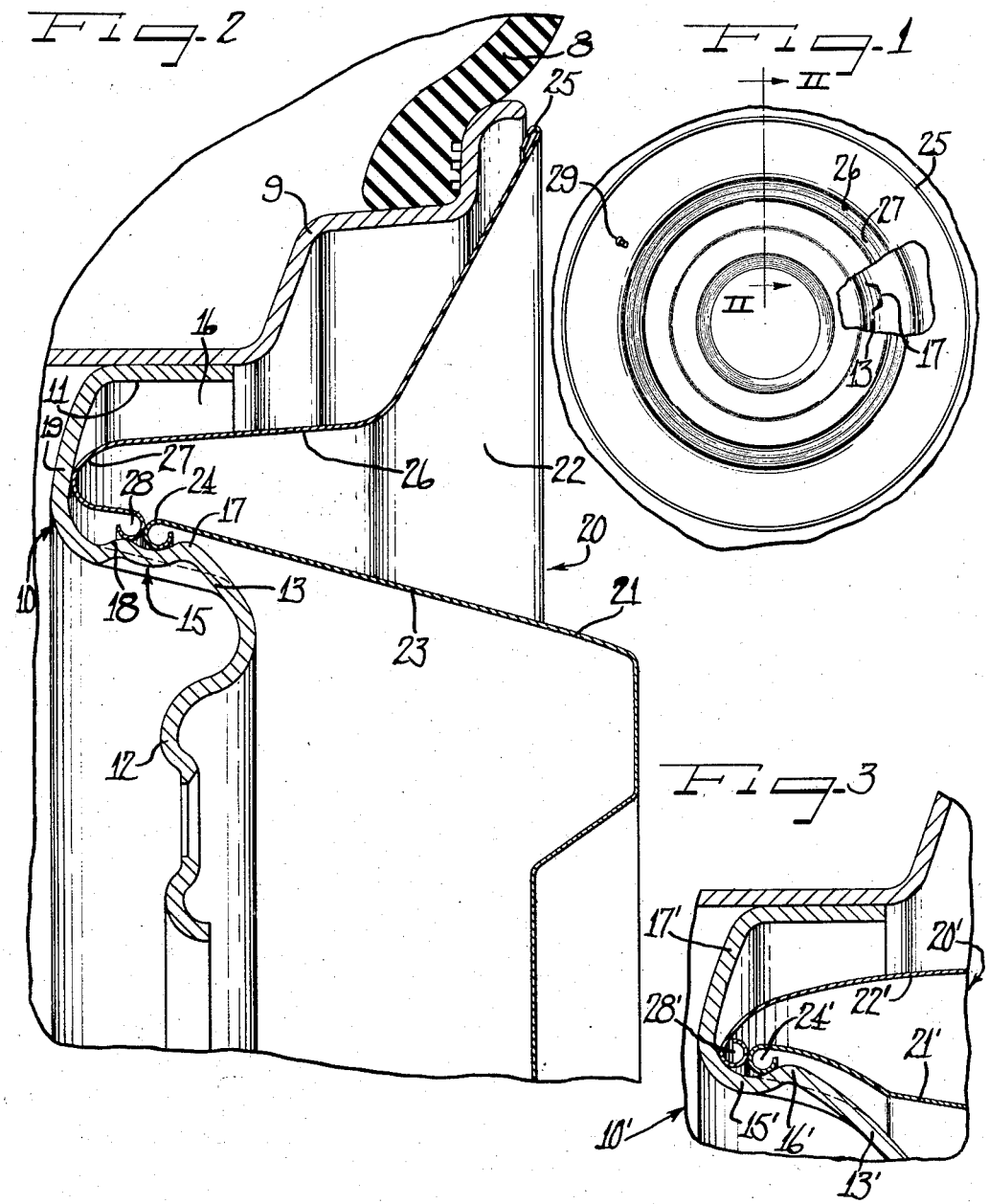
Inventor
George Albert Lyon
by Hill, Sherman, Meroni, Gross & Simpson
Attorneys

United States Patent Office 2,879,108
Patented Mar. 24, 1959

2,879,108

WHEEL COVER

George Albert Lyon, Detroit, Mich.

Application July 22, 1955, Serial No. 523,672

8 Claims. (Cl. 301—37)

This invention relates to wheel covers and more particularly to novel retaining means for a multi-part wheel cover.

With the demand by the automotive industry for relatively deeply dished automobile wheel covers, the problem of retaining such covers on the wheel has become of considerable moment, particularly where the cover is composed of a multiple of parts.

It is an object of this invention to provide a cover with simple and inexpensive means for contemporaneously retaining on the wheel a multiple of cover parts.

Another object of this invention is to provide in a wheel cover structure retaining means which is common to both of a plurality of relatively deeply dished cover parts.

Still another object of this invention is to provide retaining means for a cover assembly which enables the parts of the assembly to be economically manufactured as stampings by virtue of part of such retaining means being formed on the wheel itself.

In accordance with the general features of this invention, there is provided in a wheel structure including a wheel having a multi-flange tire rim carried by a central body part having an axially outwardly dished nose with spaced radially outwardly projecting protuberances, each with a depression area axially rearward thereof, a multi-part wheel cover including an outer annular ring opposite the tire rim and with its radially inner margin provided with a turned edge resiliently snapped over the protuberances into the depressed areas and a central dished cover part radially facing the body part and having its inner margin provided with a turned edge resiliently snapped over the protuberances onto the depression areas for clamping engagement with the ring turned edge and for retaining the cover on the wheel.

Another feature of the invention relates to providing each of the cover retaining depression areas on the wheel body with axially spaced shoulders between which ring and cover part edges are sandwiched when the cover is retained on the wheel.

Yet, another feature of the invention relates to the retention of the ring and cover part edges under resilient stress due to their edges being resiliently distorted at their points of engagement with the depressed wheel body areas.

Other objects and features of this invention may more fully appear from the following detailed description taken in connection with the accompanying drawings which illustrate several embodiments thereof and in which—

Figure 1 is a fragmentary side view of a wheel structure embodying the features of this invention;

Figure 2 is an enlarged fragmentary cross-sectional view taken on the line II—II of Figure 1 looking in the direction indicated by the arrows; and Figure 3 is a fragmentary cross-sectional view similar to a portion of Figure 2 but showing a modification of the invention.

As shown on the drawings:

In the accompanying drawings, a more or less conventional automobile wheel is illustrated with the principal exception of the cover retaining means. The reference character 8 designates a conventional pneumatic tire assembly mounted in the customary way upon a multi-flange drop center type of tire rim 9. This rim 9 is carried upon a central supporting wheel body part 10 having a peripheral flange 11 suitably secured to the base of the rim. The body part 10 may comprise a metallic stamping and includes a central bolt-on flange 12 by means of which the wheel may be detachably secured, as is customary, to a part on a vehicle axle.

The central portion of the body part 10 is bulged into a nose portion 13 which is provided on its radially outer side with a plurality of spaced depressions 15 which face the body part flange 11. These depressions 15 comprise dimples in the nose portion 13 facing the interior of an annular groove 16 defined by the nose portion 13 and the flange 11. The depressions are arranged circumferentially around the nose portion 13 and may be of any suitable number, such, for example, as three to five equidistantly spaced depressions. Each depression area is defined by axially spaced integral shoulders or protuberances 17 and 18. These shoulders are radially outwardly of the bottom or base 19 of the groove 16. The depressions may be three or more in number.

Cooperable with the aforesaid wheel is a wheel cover assembly 20 embodying the features of this invention and which includes two parts, namely, a central dished hub cap or central part 21 and a dished outer annular ring 22. These parts comprise relatively deeply drawn metallic stampings and may be made from any suitable sheet material, such, for example, as stainless steel strip stock.

The central part 21 has a relatively deep radially outwardly facing skirt 23 which terminates in a resilient turned edge 24 adapted to be seated in the depressed areas 15.

The outer part or ring 22 includes a turned reinforced peripheral pry-off edge 25 positioned in spaced relation to the tire rim 9 when the cover is on the wheel. The intermediate portion of the ring 22 has a relatively deeply drawn axial portion 26 which is opposite and faces the skirt 23 of the cap 21. Ring portion 26 has a turned or bent portion 27 adapted to bottom on the base 19 of groove 16 in the wheel body part 10. The extreme inner margin of the ring 22 is turned back upon itself and is provided with a turned resilient edge 28 adapted to seat in the depressions 15 forward of their rear shoulders 18 and contiguous with turned edge 22 of hub cap 21.

The turned edges 24 and 28 of the two cover parts are normally of such diameter as to require resilient outward deflection as they pass over the shoulders 17 on the nose portion 13. This deflection is of such extent that when the edges 24 and 28 are seated in the depressions 15, they are under resilient stress and consequently tightly grip the depressed areas of the wheel body nose portion 13. In reality, when the edges 24 and 28 are stressed outwardly at the depressed areas, portions of the edge between the depression areas tend to bulge inwardly so that the edges assume an irregular or clover-like shape.

The ring 22 may be suitably apertured to receive the customary valve stem 29 projecting from the tire rim so that the stem can be accessible from the exterior of the cover in a manner well known in the art.

In the application of the cover assembly 20 to the wheel, the ring 22 is first pressed home until its portion 27 bottoms against the body part and its turned edge 28 is in the depressions 15 under stressed engagement with shoulders 18. Thereafter, the hub cap 21 is aligned with the nose portion 23 and is pressed axially rearwardly until its edge 23 snaps over the shoulders 17 into the depressions 15 and against turned edge 28. When in this position, the turned edge 28 is tightly clamped against the body part by the edge 24 in general axial alignment therewith.

Removal of the cover may be easily effected by first prying the hub cap off of the wheel. This is made possible by inserting the end of a screwdriver or other blunt instrument in the space between the portions 23 and 26 of the cover parts and applying a pry-off force directly to the cover edge 24.

It is also possible to remove both parts by the application of a pry-off force to the ring edge 25 although it would take less force if the hub cap is first removed.

In Figure 3, there is shown a slight modification wherein the cover parts 21' and 22' of the cover assembly 20' are substantially the same with the exception of the construction of their cooperating turned edges 24' and 28' and the manner in which they cooperate with the depressions 15' in the nose portion 13' of the wheel body part 10'. In this instance, the depressions 15' are formed directly adjacent the base 17' of the groove in the body part 10'. Also, the depressions are each provided with only one shoulder 16', the other shoulder comprising the base 17' of the annular groove beyond the nose portion 13'.

In the application of this form of the cover, the turned edge 28' of the ring 22' is first pressed over the shoulders 16' into the depressions 15'. Thereafter, the turned edge 24' of the hub cap 21' is pressed over the shoulders 16' into the depressions 15' until it is bottomed against turned edge 28' thus clamping the ring 22' to the wheel body. Otherwise, this modification is substantially the same as the previously described one.

It will be understood that modifications and variations may be effected without departing from the scope of the novel concepts of the present invention.

I claim as my invention:

1. In a wheel structure including a wheel having a multi-flange tire rim carried by a central body part with the rim and body part having a junction area therebetween and an axially outwardly dished nose with spaced radially outwardly projecting protuberances radially opposite the junction area with the body part having a depression area axially rearward thereof, a multi-part wheel cover including an outer annular ring opposite said tire rim and with its radially inner margin provided with a turned edge resiliently snapped over said protuberances into said depressed areas radially spaced from the junction area and a central dished cover part radially facing said body part and having its inner margin provided with a turned edge resiliently snapped over said protuberances onto said depression areas for clamping engagement with the ring turned edge and for retaining the cover on the wheel, said ring having an annular axially rearwardly disposed portion adjacent its edge for bottoming on the wheel body part to backup the engagement of its turned edge behind said protuberance.

2. In a wheel structure including a wheel having a multi-flange tire rim carried by a central body part with the rim and body part having a junction area therebetween and an axially outwardly dished nose with spaced radially outwardly projecting protuberances radially opposite the junction area with the body part having a depression area axially rearward thereof, a multi-part wheel cover including an outer annular ring opposite said tire rim and with its radially inner margin provided with a turned edge resiliently snapped over said protuberances into said depressed areas radially spaced from the junction area and a central dished cover part radially facing said body part and having its inner margin provided with a turned edge resiliently snapped over said protuberances onto said depression areas for clamping engagement with the ring turned edge and for retaining the cover on the wheel, said ring and central cover part each extending behind said protuberances in confronting axially spaced relation and with the edge of said central part generally axially aligned with the edge of the ring disposed to the rear thereof.

3. In a wheel structure including a wheel having a multi-flange tire rim carried by a central body part with the rim and body having a junction area therebetween and an axially outwardly dished nose with spaced radially outwardly projecting protuberances radially opposite the junction area with the body part having a depression area axially rearward thereof, a multi-part wheel cover including an outer annular ring opposite said tire rim and with its radially inner margin provided with a turned edge resiliently snapped over said protuberances into said depressed areas radially spaced from the junction area and a central dished cover part radially facing said body part and having its inner margin provided with a turned edge resiliently snapped over said protuberances onto said depression areas for clamping engagement with the ring turned edge and for retaining the cover on the wheel, each of said depression areas being defined by axially spaced body part shoulders between which said ring and cover part edges are disposed when the cover is retained on the wheel.

4. In a wheel structure, a wheel with joined rim and body parts with the body part having an annular grooved portion defined by walls including an axially inwardly extending wall connected to the rim, an axially outwardly extending wall radially spaced from the axially inwardly extending wall, and a radial wall linking the aforementioned walls together with the walls providing an axially outwardly opening groove and with one of the walls having spaced radially extending protuberances with seats axially therebehind which seats are disposed radially inwardly of the area where the parts are joined and with the inner margin, a multi-part wheel cover including an outer annular ring member opposite the tire rim and with its radially inner margin resiliently snapped over said protuberances and a central dished cover part radially facing said body part and having its inner margin resiliently snapped over said protuberances.

5. In a wheel structure, a wheel with joined rim and body parts with the body part having an annular grooved portion defined by walls including an axially inwardly extending wall connected to the rim, an axially outwardly extending wall radially spaced from the axially inwardly extending wall, and a radial wall linking the aforementioned walls together with the walls providing an axially outwardly opening groove and with one of the walls having spaced radially extending protuberances with seats axially therebehind which seats are disposed radially inwardly of the area where the parts are joined and with the inner margin, a multi-part wheel cover including an outer annular ring member opposite the tire rim and with its radially inner margin resiliently snapped over said protuberances and a central dished cover part radially facing said body part and having its inner margin resiliently snapped over said protuberances, one of said members having a portion bottomed in said groove to backup the retained engagement of its margin behind said protuberances.

6. In a wheel structure, a wheel with joined rim and body parts with the body part having an annular grooved portion defined by walls including an axially inwardly extending wall connected to the rim, an axially outwardly extending wall radially spaced from the axially inwardly extending wall, and a radial wall linking the aforementioned walls together with the walls providing an axially outwardly opening groove and with one of the walls having spaced radially extending protuberances with seats axially therebehind which seats are disposed radially inwardly of the area where the parts are joined and with the inner margin, a multi-part wheel cover including an outer annular ring member opposite the tire rim and with its radially inner margin resiliently snapped over said protuberances and a central dished cover part radially facing said body part and having its inner margin resiliently snapped over said protuberances, and said margins having beaded extremities in axially abutting relation so the axially innermost extremity firmly backs up the axially outermost extremity.

7. In a wheel structure, a wheel with joined rim and body parts with the body part having an annular grooved portion defined by walls including an axially inwardly extending wall connected to the rim, an axially outwardly extending wall radially spaced from the axially inwardly extending wall, and a radial wall linking the aforementioned walls together with the walls providing an axially outwardly opening groove and with one of the walls having spaced radially extending protuberances with seats axially therebehind which seats are disposed radially inwardly of the area where the parts are joined and with the inner margin, a multi-part wheel cover including an outer annular ring member opposite the tire rim and with its radially inner margin resiliently snapped over said protuberances and a central dished cover part radially facing said body part and having its inner margin resiliently snapped over said protuberances, said cover members each having an axially extending portion extending into said groove and in radially confronting relation to one another defining an annular dished area and with their respective inner margins coacting with the protuberances to maintain the axially extending portions in the groove.

8. In a wheel structure, a wheel with joined rim and body parts with the body part having an annular grooved portion defined by walls including an axially inwardly extending wall connected to the rim, an axially outwardly extending wall radially spaced from the axially inwardly extending wall, and a radial wall linking the aforementioned walls together with the walls providing an axially outwardly opening groove and with one of the walls having spaced radially extending protuberances with seats axially therebehind which seats are disposed radially inwardly of the area where the parts are joined and with the inner margin, a multi-part wheel cover including an outer annular ring member opposite the tire rim and with its radially inner margin resiliently snapped over said protuberances and a central dished cover part radially facing said body part and having its inner margin resiliently snapped over said protuberances, and said margins having beaded extremities in axially abutting relation so the axially innermost extremity firmly backs up the axially outermost extremity, said extremities being resiliently distorted at said protuberances so that they are in resiliently stressed engagement with the wheel body part.

References Cited in the file of this patent

UNITED STATES PATENTS

| | | |
|---|---|---|
| 2,263,243 | Lyon | Nov. 18, 1941 |
| 2,304,583 | Lyon | Dec. 8, 1942 |
| 2,664,318 | Lyon | Dec. 29, 1953 |

FOREIGN PATENTS

| | | |
|---|---|---|
| 629,134 | Great Britain | Sept. 13, 1949 |